US008963998B2

(12) United States Patent
Ferguson (10) Patent No.: US 8,963,998 B2
(45) Date of Patent: Feb. 24, 2015

(54) FULL REFERENCE SYSTEM FOR PREDICTING SUBJECTIVE QUALITY OF THREE-DIMENSIONAL VIDEO

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 985 days.

(21) Appl. No.: 13/088,091

(22) Filed: Apr. 15, 2011

(65) Prior Publication Data
US 2012/0262549 A1 Oct. 18, 2012

(51) Int. Cl.
H04N 13/00 (2006.01)
G06T 7/00 (2006.01)
H04N 13/04 (2006.01)

(52) U.S. Cl.
CPC ....... H04N 13/0018 (2013.01); H04N 13/0425 (2013.01); G06T 7/0002 (2013.01); H04N 2013/0088 (2013.01); H04N 2013/0081 (2013.01); G06T 2207/20221 (2013.01); G06T 2207/30168 (2013.01); G06T 2207/10021 (2013.01)
USPC .......................................................... 348/46

(58) Field of Classification Search
None
See application file for complete search history.

(56) References Cited

U.S. PATENT DOCUMENTS

| 7,856,055 | B2* | 12/2010 | Zhou et al. ............... 375/240.12 |
| 2005/0259147 | A1* | 11/2005 | Nam et al. ...................... 348/43 |
| 2008/0085049 | A1* | 4/2008 | Naske et al. ................... 382/154 |
| 2010/0007718 | A1* | 1/2010 | Rohaly et al. .................... 348/46 |
| 2010/0039499 | A1* | 2/2010 | Nomura et al. .................. 348/43 |
| 2010/0091097 | A1* | 4/2010 | Pockett ............................ 348/54 |
| 2010/0323609 | A1* | 12/2010 | Aramaki ..................... 455/3.01 |
| 2011/0025829 | A1* | 2/2011 | McNamer et al. ............... 348/50 |
| 2011/0043613 | A1* | 2/2011 | Rohaly et al. ................... 348/50 |
| 2011/0074933 | A1* | 3/2011 | Held et al. ....................... 348/51 |
| 2011/0080401 | A1* | 4/2011 | Tan et al. ....................... 345/419 |

* cited by examiner

Primary Examiner — Jayanti K Patel
Assistant Examiner — Reza Aghevli
(74) Attorney, Agent, or Firm — Marger Johnson & McCollom PC (57) ABSTRACT

A method of generating a predictive picture quality rating makes a disparity measurement of a three-dimensional image by comparing left and right sub-components of the three-dimensional image. Then the left and right sub-components of the three-dimensional image are combined (fused) into a two-dimensional image, using data from the disparity measurement for the combination. A predictive quality measurement is then generated based on the two-dimensional image, and further including quality information about the comparison of the original three-dimensional image.

19 Claims, 5 Drawing Sheets

FULL REFERENCE SYSTEM FOR PREDICTING SUBJECTIVE QUALITY OF THREE-DIMENSIONAL VIDEO

TECHNICAL FIELD

This disclosure relates to quality prediction of images, and, more particularly, to a full reference system for predicting subjective quality of three-dimensional (stereoscopic) video.

BACKGROUND

Industries such as television broadcast, movie and others currently employing stereoscopic based 3-D technologies are facing several quality assurance and quality control issues. In video, processing artifacts and impairments are distracting, more to some users than others. Additionally, although currently rising in popularity, three-dimensional video may cause visual discomfort for some viewers, where the discomfort is typically related to an amount of horizontal disparity between stereoscopic (left and right) images of the 3-D image.

Currently techniques are available that provide indications, predictions, alarms and causes of visual discomfort and impairments for video in production settings for two-dimensional video. Some of these techniques, albeit in a difficult fashion, have been used to measure various combinations of measuring right and left images of 3-D image. For example, techniques have been developed to measure the right and left 2-D images that make up a 3-D image, separately, then average the right and left quality results. As another example, the TEKTRONIX PQA600 can be used for 3D video quality assessment by measuring processed left (test) video against unprocessed left (reference) video for a video quality assessment of the left view, and likewise for the right view.

At an increasing rate, however, 3-D video is being generated from existing 2-D video. Additionally, other 3-D processing is occurring, such as 3-D movies made for cinema being repurposed as a blue-Ray DVD, etc., for R&D of video equipment (capture, processing such as codecs, etc.), and other applications. Currently there are no full reference systems for directly predicting subjective quality of stereoscopic video.

Embodiments of the invention address these and other limitations of the prior art.

SUMMARY

In some aspects of the invention, a method of generating a predictive picture quality rating is provided. In general, a disparity measurement is made of a three-dimensional image by comparing left and right sub-components of the three-dimensional image. Then the left and right sub-components of the three-dimensional image are combined (fused) into a two-dimensional image, using data from the disparity measurement for the combination. A predictive quality measurement is then generated based on the two-dimensional image, and further including quality information about the original three-dimensional image.

Other aspects of the invention include a quality prediction system for predicting the quality of a test stereoscopic video against a reference stereoscopic video. The prediction system includes inputs for accepting a test three-dimensional video and a reference three-dimensional video. The left and right components of these three-dimensional videos are then separately compared in a comparator and disparity measurements taken. A fuser then respectively combines the left and right elements of the three-dimensional images into a two-dimensional images using data from the comparison. A picture quality analyzer is then used to generate picture quality predictions or measurements based on the two-dimensional images. Further, a summary facility includes information of the three-dimensional comparison in the final output of the quality prediction system.

DETAILED DESCRIPTION

The most common method of stereoscopic video representation so far used for broadcast is separate left and right video views sent either side by side or top and bottom of each video frame (using the widely known MPEG-2 or H.264 standards) or in separate respective channels (Multiview Video Coding, MVC of H.264). Alternatively, a 2-D frame may be sent in one channel along with its corresponding depth map in another channel (i.e., possible via adaptation of MVC). The former (separate left and right) method is used to explain concepts of the inventive system, although the latter, the 2-D frame+depth channel video representation, may also be measured using concepts of the invention.

Embodiments of the invention provide a scalable (over image resolution, frame rate, real-time vs. higher accuracy, etc.) method to generate a predictive quality rating that is compatible with current solutions for 2-D: one scalar metric per frame and per sequence, namely DMOS prediction, the subjective difference mean opinion score between 3-D test and 3-D reference video.

Figure 1:
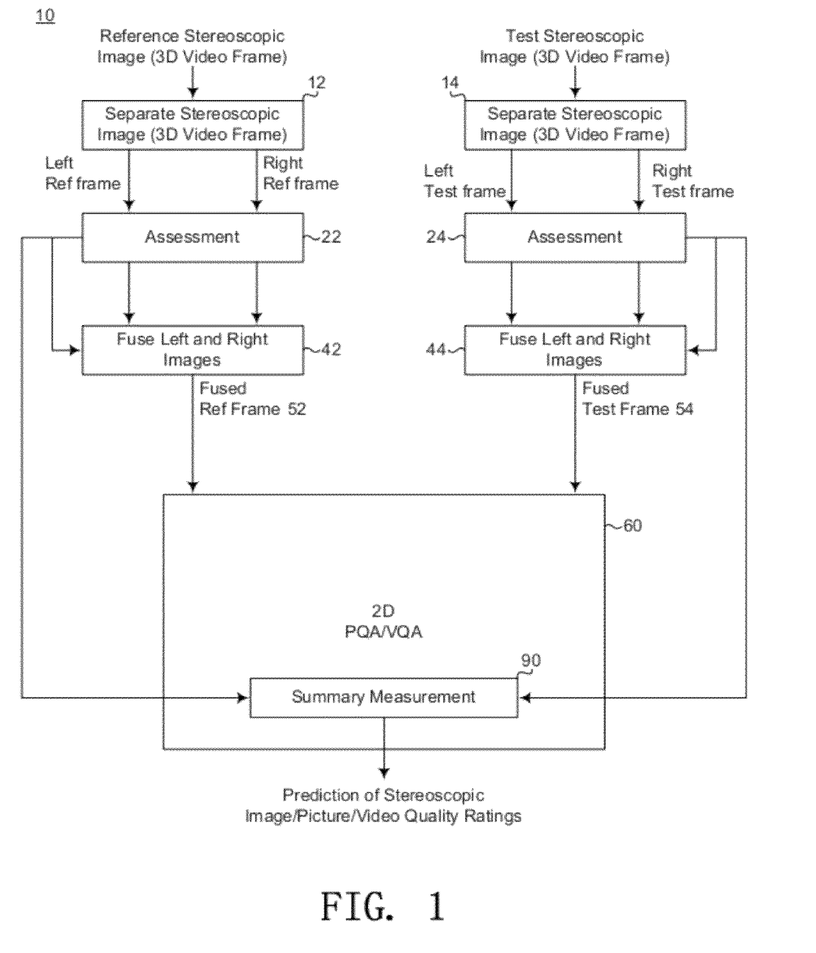
FIG. 1 is a block diagram of a full reference subjective quality predictor for stereoscopic video according to embodiments of the invention.

FIG. 1 is a block diagram of a full reference subjective quality predictor 10 for stereoscopic video according to embodiments of the invention. The quality predictor 10 includes two separate inputs for 3-D images or video, a reference image 12 and a test image 14. Throughout this disclosure it is understood that the use of the identifier 3-D image or 3-D images includes both static images and video images. Each of the 3-D images includes both a left component and a right component, as illustrated.

In a general sense, described in more detail below, an initial measurement is separately made for each of the 3-D images in respective assessment blocks 22, 24. Then, each of the left and right components of each of the reference image 12 and test image 14 is combined into respective fused images. Specifically, the left and right images of the reference image 12 is combined in a fuser 42 to produce a fused reference image 52, and the left and right images of the test image 14 is combined in a fuser 44 to produce a fused test image 54. The fusing process uses data from the respective assessment blocks 22, 24 in producing the fused images 52, 54.

The fused reference and test images image 52, 54 are fed as inputs to a 2-D quality analyzer 60, which, in some embodiments, may be the aforementioned TEKTRONIX PQA600, or an analyzer having similar capabilities. The output of the analyzer 60 is sent to a summary facility 90. Additionally the summary facility 90 includes inputs from the assessment blocks 22, 24, which provide the summary facility with information about the 3-D aspects of the 3-D test image 12 and 3-D reference image 14. The summary facility 90 then generates an output of a predicted picture quality rating of the 3-D stereoscopic images 12, 14, such as a DMOS (Difference Mean Opinion Score) rating or other rating useful to those analyzing the stereoscopic video.

Figure 2:
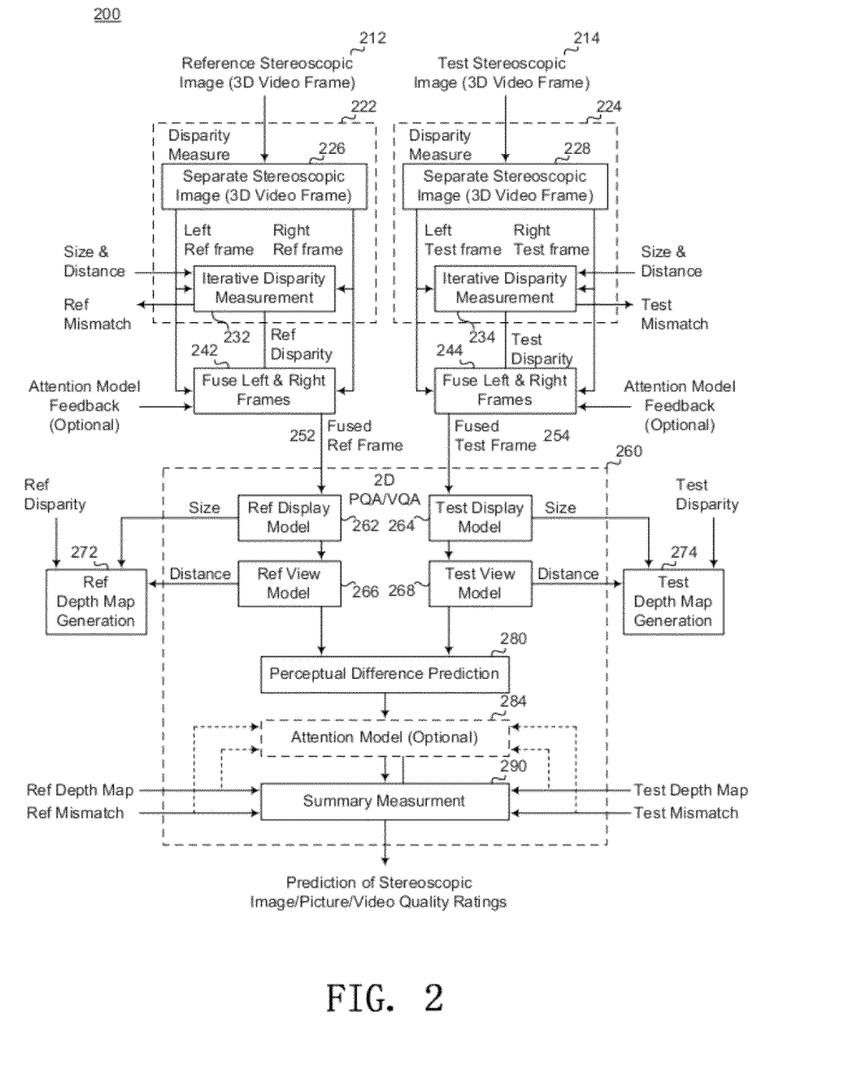
FIG. 2 is a block diagram showing additional detail of the full reference subjective quality predictor for stereoscopic video of FIG. 1.

FIG. 2 is a block diagram showing additional detail of an example embodiment 200 of the full reference subjective quality predictor for stereoscopic video of FIG. 1.

The quality predictor 200 includes a 3-D reference image input 212 and a 3-D test image input 214. These 3-D inputs are provided to respective disparity measuring blocks 222, 224. Included in the measuring block 222 is a separator 226, which divides the reference image input 212 into its left and right component parts, if not already received in that manner. In some cases, the separation may be trivial (as in H.264 MVC). In other cases, the left channel may be taken from the left or top portion of the reference image input 212 while the right channel is in the remainder of the input frame. The measuring block 224 includes a similar separator 228 for the test image 214. At the end of the splitting, there are a total of 4 video channels: reference left, reference right, test left and test right.

Figure 3:
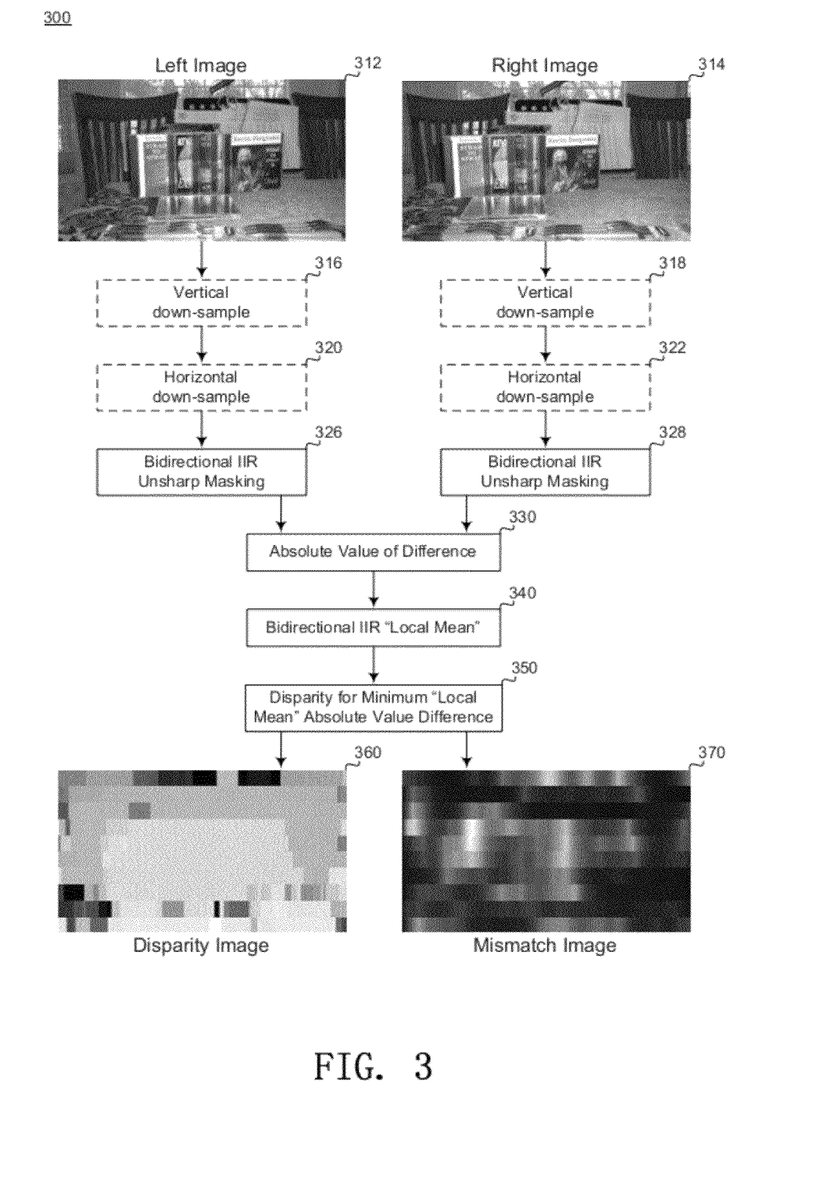
FIG. 3 is an example flow diagram illustrating processes that can be used to compare stereoscopic images.

The left and right elements of each of the images 212, 214 are respective inputs to a disparity measurement block 232, 234, which are used to measure disparity and mismatch per frame of the 3-D images 212, 214. FIG. 3 illustrates example processes that occur in the disparity measurement blocks 232, 234.

FIG. 3 is a block diagram illustrating an example process 300 that illustrates creating disparity and mismatch data images from example left and right frames of a stereoscopic image. In the process 300, a 3-D image is already separated into a left image 312 and right image 314. It is important to note here that the left image 312 and right image 314 illustrated in FIG. 3 is only one of the reference 3-D image 212 or test 3-D image 314 of FIG. 2. In other words, the process illustrated in FIG. 3 occurs for both the reference and test images 312, 314, although processing for only one of the stereoscopic images is illustrated.

As described in a paper "A Taxonomy and Evaluation of Dense Two-Frame Stereo Correspondence Algorithms," by Daniel Scharstein and Richard Szeliski, Microsoft Technical Report MSR-TR-2001-81, available at www.research.microsoft.com, which is referred to as the "Technical Report" general methods have been described to measure spatial disparity of three-dimensional images. The general processing steps when generating a disparity measurement are: a) quantifying a measurement indicative of spatial matching of portions of the respective images on a local basis; b) aggregating the local results from such quantification; c) disparity computation/optimization; and d) disparity refinement.

In optional processes 316, 318, left and right images 312, 314 are first down-sampled in the vertical direction. For example, if the images 312, 314 have 1080 pixels in the vertical direction and 1920 pixels in the horizontal direction, as a standard HD video frame, each image may be down-sampled into a 10×1920 pixel image. This creates a pair of images (left and right) where each image has exactly 10 horizontal lines, each 1920 pixels long.

In another set of optional processes, 320, 322, the vertically downsampled image lines may likewise be horizontally downsampled into a shorter line. This may be appropriate if the display for a monitor for evaluating the stereoscopic images is less than 1920 pixels wide, for instance. Rather than downsampling an image line into a specific number of pixels, it may be downsampled by a given percentage, for instance to one having a length of 70% of the original length. Such downsampling in both the vertical and horizontal directions is a tradeoff between computing speed of the system vs. accuracy of the overall measurements.

A pair of processes 326, 328 performs an unsharp mask process on the original or downsampled images by subtracting the respective bidirectional IIR low pass filtered version from each, using bi-directional IIR filters as described in US Published Application 2008/0152257, entitled "Measurement Apparatus and Method of Measurement of Video Spatial Scale, Offset and Cropping," and US Published application 2010/0226592 entitled "Methods and Systems for Image Registration," both of which are incorporated by reference herein. The filter coefficients of the bi-directional IIR filter used may be $a1=1-b0$. This results in a generated DC (low frequency) line for each of the images or vertically downsampled image lines.

Next the unsharp masked images are combined in a process 330 using, for example, an absolute value of the differences between the modified left and right images. Other techniques could be used as well, for example using a squared difference, cross-correlation, or a phase or wavelet phase analysis. In effect, the left and right images are compared at different relative shifts with local matching quantification results of each shift.

A process 340 passes the difference values through the bidirectional IIR low pass filter, as described above, to create a continuously local mean. A next process 350 performs a disparity computation/optimization. Typically this can be quickly performed by taking the best match per image portion. For example, the disparity computation may be performed per pixel if the stereo correspondence is being measured at that density. However, after all pixel shifts are calculated, the group of shifts may be evaluated for "smoothness," or discontinuities deemed unlikely in some applications. Filtering by noise, median or other filters may be used.

At this stage of the process 300, a disparity map or image 360 and a mismatch map or image 370 are created from the output of the process 350. First, for each column of the output of the process 350, the minimum error value is selected and its data value is coded as a pixel of the mismatch image 370. The top line of the mismatch image 370 is made from selecting the minimum values in each column of the output of the process 350, and is replicated an additional 107 times to compensate for the vertical downsampling processes 316, 318. That is, the first 108 lines of the mismatch image 370 are identical. This ensures that the mismatch image 370 and the original stereoscopic images 312, 314 have the same dimensions, even if the original images 312, 314 were downsampled. After all of the minimum error values are selected, the values may be normalized for maximum image contrast for the mismatch image 370. This mismatch image 370 serves as an representation of whether a viewer is likely to be successful in generating the three-dimensional depth perception of the particular section of the stereoscopic image. In other words, higher levels of mismatch, which may appear as light areas in the mismatch image 370, indicate that the viewer may have problems with successful fusion of the left and right images 312, 314 in the viewer's mind.

Also from the data output from the process 350, a disparity image 360 is generated. Each pixel in the disparity image 360 represents the number of pixels that each pixel must be shifted along its horizontal line to make the minimum error determined above. In other words, differently where the mismatch image 370 was made by taking the actual minimum comparison value in every column, the disparity image 360 is made by plotting in the disparity image 360 the shift corresponding to the line number of each column in which the minimum value appeared. Shifts are related to line number in this embodiment by shift=LineNumber*ShiftIncrement+InitialShift. Like the mismatch image 370, the disparity image 360 is made by replicating the line an additional 107 times so that its size matches the original left and right images 312, 314.

Extremes of depth and high rate of change of depth over time in 3-D video are known to be associated with visual discomfort. Likewise, mismatched portions of left and right can be a source of visual discomfort. Therefore it is appropriate that this information be factored into the ultimate prediction of stereoscopic image quality, as further described below.

Referring back to FIG. 2, the disparity and mismatch data are illustrated as being produced by the disparity measurement blocks 232, 234, though the disparity and mismatch data need not necessarily be produced into images, such as those illustrated in FIG. 3.

Figure 4:
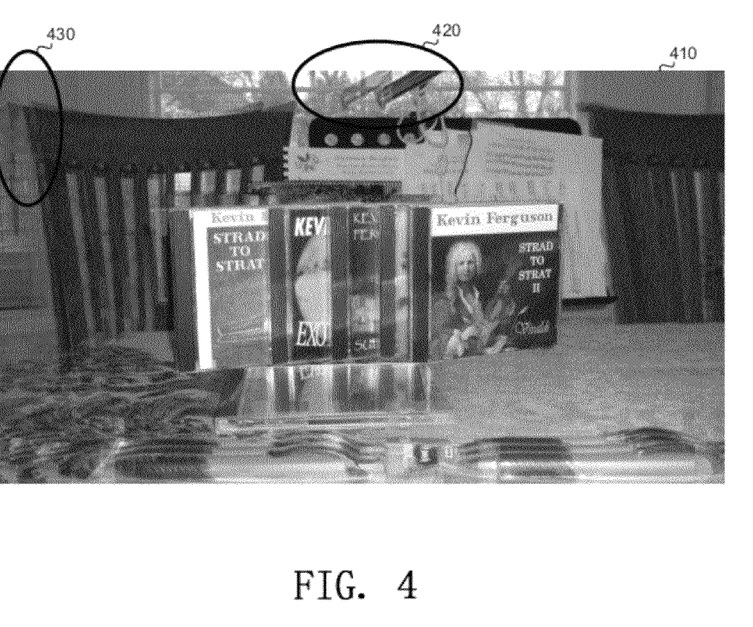
FIG. 4 is an example of a single fused image made from a combination of two separate images shown in FIG. 3.

Next, the disparity measurements for the reference frame 212 and test frame 214 are used to create respective fused frames 252, 254, in respective processes 242 and 244. An example of a fused frame is illustrated in FIG. 4, where a fused frame 410 is the end result of fusing the individual left image 312 with the right image 314 of FIG. 3, and additionally using the disparity measurements calculated and represented as the image 360. Note particular regions 420 and 430 of the fused frame 410 where evidence of the fusing is apparent.

For each portion of the video, the disparity map created in the process 300 of FIG. 3 is used as a corrective offset to align the left and right channels of the particular 3-D image 212 or 214. The thus registered left and right frames are "fused" by a "cross-fade" of the two, implemented as a weighted sum of left and right frames. Nominally the cross-fade is such that left and right are equally weighted, i.e., for example the fused image 252 is composed of pixels such that:

fused[pixel]=left[pixel+offset(disparity)*0.5]*0.5+
right[pixel−offset(disparity)*0.5]*0.5.

However, the fusing of the fused reference image 252 (or fused test image 254) in FIG. 2 need not necessarily be equal. In other words, optionally, right or left eye dominance may be modeled using direct user control or attention model feedback. For example, the attention model (described below) may determine that an object closer in the left eye will cause the left eye to be dominant, or some more attention attracting regions may counter this. If the left eye is more dominant, the weighting of 0.5 above is increased, accordingly, with a 1's compliment weighting used for the right. Likewise the weighting could favor right eye dominance. The fused image 410 of FIG. 4 shows an example of the luminance portion of the fused frame using the left image 312 and right image 314 (FIG. 3) having equal weights.

The fused reference and test images 252, 254 are inputs to a 2-D video quality prediction system 260. This video quality prediction system 260 ultimately generates a predictive subjective quality in units of DMOS. However, the video quality prediction system 260 also creates useful intermediate results of perceptual difference responses. These responses are given in terms of a percent perceptual contrast difference as well as, optionally, a color perception difference using CIECAM02 {a,b} units. CIECAM02 is the widely known *Color Appearance Modeling for Color Management Systems*, Published in 2002 by the CIE Technical Committee 8-01.

The video quality prediction system 260 further includes various models for developing its predictive outcomes, such as a reference and test display model 262, 264, as well as a reference and test view model 266, 268. These models are used to adjust the predictive outcomes based on the viewing conditions of the video being evaluated.

A perceptual difference prediction system 280 takes the output from the various models 262, 264, 266, and 268 in generating a prediction of the differences between the reference image 212 and test image 214. An optional attention model functions to modify the final output prediction scores based on actions occurring within the frames of the images 212, 214 themselves. Finally, a summary of measurements module 290 combines all of the information generated by the perceptual difference prediction system 280 as well as the test mismatch data generated by the disparity measurement systems 232, 234, described above, as well as a pair of depth maps, one for the reference video and one for the test video, for generating the final prediction of stereoscopic image quality ratings as an output of the system 200.

As mentioned above, a set of factors used by the summary of measurements module 290 is a reference depth map and a test depth map, produced by respective generators 272, 274, as described with reference to FIG. 5.

Figure 5:
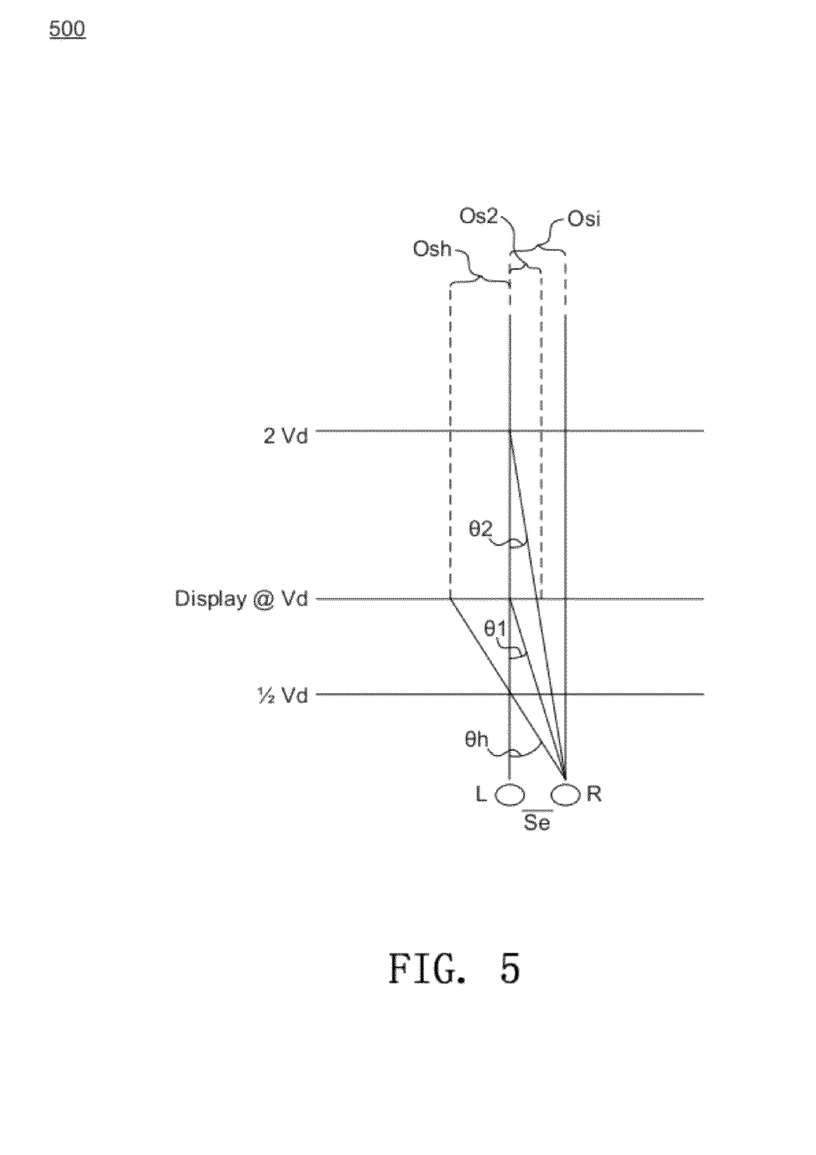
FIG. 5 is a reference image illustrating plane viewing depths and viewing angles for a standard view of three-dimensional images, used in embodiments of the invention.

FIG. 5 is illustrative reference 500 of example display angles at relative distances from a pair of offset left and right eyes. In the reference 500 left and right eyes are set apart by a distance Se. As shown in FIG. 5, the intersection of lines from left and right eyes at each display depth creates an angle which may be determined by respective geometry. In the reference 500 three depth planes are illustrated, a standard depth plane Vd, as well as a depth plane at ½ the distance of Vd as well as one twice as far, labeled 2Vd. For any point at any depth plane to be viewed, the lines of sight from left and right eye must intersect at that point. These lines of sight also intersect the display plane at various points. Using the intersection of the left line of sight with the display plane as a reference, the intersection of the right line of sight with the display plane may be measured as an offset Os. Thus Os represents the horizontal shift between left and right images for a point at a particular depth. In FIG. 5, with respect to the right eye, Osi represent the shift for points at infinity, Os2 for points at twice the viewing distance, and Osh for half the viewing distance. Note that Os=0 for points on the display plane.

From this relationship right and left separation can be determined as a function of depth, and vice versa. For points along the left (or right) center line, the mathematical relationship is quite simple due to similar triangles:

$$Os = Se \times (depth - Vd)/depth \qquad \text{Eqn. 1}$$

This simple relationship is also a good approximation for other points with small angles relative to the center line. The general equation for Os, including points off of the left (or right) center lines uses a factor of 1/cos(leftAngle) for flat screen displays:

$$Os = Se \times (depth - Vd)/(depth * \cos(leftAngle)) \qquad \text{Eqn. 2}$$

This relationship may be used convert between disparity (Os) and depth.

Subjectively, when properly set-up, the display shows a plane in line with the display screen surface (the viewing distance or 1 Vd), a plane ½ the distance from the viewer (½ Vd), a plane at twice the viewing distance (2 Vd) and a plane at infinity. A disparity (Os) of greater than Se corresponds to a depth that is "beyond infinity." Objects rendered with this much disparity generally cause discomfort proportional to the amount that Os exceeds Se in typical viewers.

This exceeding of Se, as well as other violations of Panum's area/volume limit (fusion limits) can be taken into consideration (optionally) in the DMOS calculation of the full reference subjective quality predictor for stereoscopic video 200 of FIG. 2 as an extra component in the perception difference vector. For example, while the depth difference is taken as one component of the perceptual difference vector described above, the disparity amounts beyond the fusion limit (in part accounted for in the mismatch difference) can be factored into the DMOS calculations as well.

Using the factors from FIG. 5, reference and test depth maps for the corresponding reference and test images 212, 214 may be generated as illustrated in FIG. 2. Factors affecting the depth maps include the size of the image (taken from the display model), the distance from the display plane (taken from the view model), as well as the disparity between the left and right images of the respective reference and test images 212, 214. This test dept map is then provided to the summary measurer 290 to modify the already-generated prediction from the standard 2-D prediction of quality ratings.

The depth map difference (test—reference) and the mismatch map difference (test—reference) are combined in the summary of measurements module 290 of FIG. 2 with the 2-D perceptual difference (% perceptual contrast difference & optionally, color perception difference using CIECAM02 {{a,b}} units) and converted to DMOS using techniques such as those described in U.S. Pat. No. 6,829,005. In some embodiments each perceptual difference (including depth and mismatch) component is normalized as per its corresponding value from a worst case training sequence. Whereas the DMOS prediction methods described in the '005 patent uses only the perceptual contrast difference and normalizes to perceptual contrast difference of an example of very bad video (simulation worst case training of ITU-R BT.500), in this method, a vector may be created by normalizing each perceptual difference component by its respective worst case video response. For example, example video with worst case DMOS (test video considered poor in quality) with primarily errors in depth may be used to normalize the depth difference. The length of this normalized difference vector is then measured and subjected to the S-curve nonlinearity, again, using techniques such as those described in the '005 patent. In other embodiments each of the perceptual difference components may be separately processed according to S-curve nonlinearity, rather than being normalized to averages.

The 2-D video quality prediction system 260 generates a perceptual difference vector as an intermediate step in producing a DMOS prediction. Although there are a multitude of factors that may be considered in generating the perceptual difference vector, an example is provided below. This perceptual difference vector may include several components such as in the following:

PerceptualDifferenceVector={pad,pbd,pcd,pdd,ped, pmd}

Where
pad=difference in CIECAM02 color appearance coordinate a,
pbd=difference in CIECAM02 color appearance coordinate b,
pcd=difference in perceptual contrast in units of percent change,
pdd=difference in perceived depth in units of percent change,
ped=difference in amount the disparity has exceeded the fusion limit
(in units of depth), and
pmd=difference in left to right image mismatch from occlusions, exceeding fusion limits, mismatched impairments, mismatched lamination, etc.

For one example of pdd, $pdd=100\%*(testDepth-refDepth)/refDepth$

Additionally, using the perceptual difference vector generated by the 2-D video quality prediction system 260, there are a variety of ways of creating a DMOS prediction, such as by using techniques disclosed in the '005 patent, and others. An example of producing a DMOS prediction is given below:

$DMOS=Scurve(vectorLength(trainingNormalize(PerceptualDifferenceVector))$

Where trainingNormalize({pad, pbd, pcd, pdd, ped, pmd})=
{(pad-JNDa)/(tpad-JNDa), (pbd-JNDb)/(tpbd-JNDb), (pcd-JNDc)/(tpcd-JNDc), (pdd-JNDd)/(tpdd-JNDd), (ped-JNDe)/(tped-JNDe), (pmd-JNDm)/(tpmd-JNDm)}

JNDa=just noticeable difference in the CIECAM02 a dimension, ~0.025 (for example)
JNDb=just noticeable difference in the CIECAM02 b dimension, ~0.025 (for example)
JNDc=just noticeable difference for perceptual contrast, ~0.1% (for example)
JNDd=just noticeable difference for depth, viewing condition and content dependent, ~0 (for example).
JNDe=just noticeable difference for depth exceeding fusion, JNDd
JNDm=just noticeable difference for mismatch, ~JNDd converted to disparity.
tpad=worst case training result for pad
tpbd=worst case training result for pbd
tpcd=worst case training result for pcd
tpdd=worst case training result for pbd
tped=worst case training result for ped
tpmd=worst case training result for pmd Further, in the 2-D video quality prediction system 260, any combination of perceptual responses may be used in generating the DMOS prediction. For example, luminance only DMOS may be calculated, matching the existing TEKTRONIX PQA DMOS results simply by only using pcd and assigning 0's to the other components.

Variations on Devices and Methods Described Above

Advantages of embodiments of the invention such as that illustrated in FIG. 1 and FIG. 2 are a balance of accuracy and robustness vs. speed, complexity and implementation expediency. A still more accurate version may be implemented at the expense of considerable more computational cost and complexity. In this variation of the method, the 4 video channels (reference left, reference right, test left and test right) illustrated in FIG. 2 are first converted into perceptual response (% perceptual contrast for luminance and, optionally, CIECAM02 {{a,b}} for color). This may be performed by the single-ended (no reference) version of creating a prediction of subjective quality rating of video, which substitutes all black for the reference input (or equivalently, the reference spatiotemporal adaptive filter output) for each of the four input video channels. These 4 perceptual responses are then used to produce disparity and mismatch measurements described above. The remainder of the processing may be the same or similar.

The accuracy improvement primarily stems from predicting degrees of fusion of the image fused image, since this variation takes into account visual acuity, masking and other determinants of fusion success.

Another option to the main methods described above involves the iterative computation of disparity described with reference to FIG. 3. The display size and viewing distance information used in the 2-D video quality prediction system 260 can be used to convert between disparity and depth, including hysteresis processing, and thereby set disparity range limits based on Panum's area (volume), rate of disparity change (via depth change rate associated with a vergence rate).

The optional attention model 284 which may be "distracted" by impairments due to distractions, may be updated to include depth difference and mismatch differences as additional distractions. This may be performed by simply adding these differences using calibration weights (in a fashion for perceptual contrast difference distraction). In effect, the purpose of the attention model is to estimate the probability of drawing attention at each location in space and time. The probability of drawing attention to an area with depth differences (test relative to reference 3-D video) is generally proportional to the magnitude of this difference. Likewise for mismatch difference.

As introduced above, the same or similar methods as those described herein can also be used for measuring both {left, right} video and {2-D, depth} video representations: for {2-D, depth} video, the disparity measurement and fusion stages may be skipped, and the mismatch set to 0, or the mismatch may be estimated using sparse application of methods such as depth-image-based rendering (DIBR) method. For example, mismatch due to occlusions may be estimated rapidly by 1) searching for large depth gradients;
2) making local (sub-image) left and right view estimations using DIBR (or similar methods); and
3) calculating the mismatch between them using the same or similar techniques to those described with reference to FIG. 3.

Although particular embodiments have been described, it will be appreciated that the principles of the invention are not limited to those embodiments. Variations and modifications may be made without departing from the principles of the invention as set forth in the following claims.

What is claimed is:

1. A method of generating a predictive picture quality rating, comprising:
   accepting a three-dimensional image having a left portion and a right portion;
   generating a disparity measurement by comparing the left and right portions of the three-dimensional image;
   combining the left and right portions of the three-dimensional image into a single two-dimensional image using the disparity measurement;
   accepting a second three-dimensional image having a left portion and a right portion;
   generating a second disparity measurement by comparing the left and right portions of the second three-dimensional images;
   combining the left and right portions of the second three-dimensional image into a single second two-dimensional image using the second disparity measurement;
   applying at least a first predictive quality technique to the two-dimensional image and to the second two-dimensional image to generate a two-dimensional quality rating;
   modifying the two-dimensional quality rating with quality information about the three-dimensional image or the second three-dimensional image to generate an overall quality rating; and
   outputting the overall quality rating.

2. The method of generating a predictive picture quality rating of claim 1, wherein combining the left and right portions of the three-dimensional image into a single two-dimensional image uses the disparity measurement as a corrective offset.

3. The method of generating a predictive picture quality rating of claim 1, wherein combining the left and right portions of the three-dimensional image into a single two-dimensional image uses equal weighting between the left and right portions.

4. The method of generating a predictive picture quality rating of claim 1, further comprising:
   generating a mismatch measurement by comparing the left and right portions of the three-dimensional image; and
   including a representation of the mismatch measurement as a factor in the overall quality rating.

5. The method of generating a predictive picture quality rating of claim 1, further comprising:
   including a representation of perceived depth information as a factor in the overall quality rating.

6. The method of generating a predictive picture quality rating of claim 1, further comprising:
   including a representation of a comparative analysis between the disparity measurement and a fusion limit as a factor in the overall quality rating.

7. A quality prediction system for predicting the quality of a test stereoscopic video against a reference stereoscopic video, the quality prediction system comprising:
   a first input for accepting a test three-dimensional video, the test three-dimensional video including a left component and a right component;
   a second input for accepting a reference three-dimensional video, the reference three-dimensional video including a left component and a right component;
   a first analyzer structured to generate first disparity information relative to a comparison of the left component of the test three-dimensional video to the right component of the test three-dimensional video;
   a second analyzer structured to generate second disparity information relative to a comparison of the left component of the reference three-dimensional video to the right component of the reference three-dimensional video;
   a first fuser structured to combine the left and right components of the test three-dimensional video to create a fused two-dimensional test video using the disparity information from the first analyzer;
   a second fuser structured to combine the left and right components of the reference three-dimensional video to create a fused two-dimensional reference video using the disparity information from the second analyzer;
   a quality analyzer structured to compare the two-dimensional reference video to the two-dimensional test video and generate a first predictive quality rating; and
   a summary facility coupled to the quality analyzer and structured to modify the first predictive quality rating with information derived from the first and second analyzer to generate a predictive quality rating of a comparison of the test three-dimensional video to the reference three-dimensional video.

8. The quality prediction system according to claim 7 in which the first disparity information comprises mismatch data related to a comparison of the left component of the reference three-dimensional video to the right component of the reference three-dimensional video.

9. The quality prediction system according to claim 7 in which the first disparity information comprises disparity data related to a comparison of the left component of the reference three-dimensional video to the right component of the reference three-dimensional video.

10. The quality prediction system according to claim 7 in which the information derived from the first and second analyzer comprises first and second depth map information, respectively derived from the test three-dimensional video and the reference three-dimensional video.

11. The quality prediction system according to claim 7 in which the first fuser uses the first disparity information as a corrective offset when combining the left and right components of the test three-dimensional video to create the fused two-dimensional test video.

12. The quality prediction system according to claim 7 in which the first fuser applies equal weighting to the left and right components of the test three-dimensional video when creating the fused two-dimensional test video.

13. The quality prediction system according to claim 7 in which the first fuser uses a 1's complement procedure to allocate different weightings to the left and right components of the test three-dimensional video when creating the fused two-dimensional test video.

14. The quality prediction system according to claim 7 in which the summary facility generates a perceptual difference vector including components from at least one CIECAM02 color appearance coordinate.

15. The quality prediction system according to claim 14 in which the summary facility generates the perceptual difference vector including components from a perceived depth of at least one of the test or reference three-dimensional videos.

16. The quality prediction system according to claim 14 in which the summary facility generates the perceptual difference vector including components from a comparative analysis of the first and second disparity information to a fusion limit.

17. The quality prediction system according to claim 14 in which the summary facility generates the perceptual difference vector including components from an occlusion analysis.

18. The quality prediction system according to claim 14 in which the summary facility generates the perceptual difference vector including components from a mismatch data analysis.

19. The quality prediction system according to claim 14 in which the summary facility generates the perceptual difference vector including components from an attention analysis.

* * * * *